(12) United States Patent
Sato

(10) Patent No.: US 9,421,975 B2
(45) Date of Patent: Aug. 23, 2016

(54) VEHICLE CONTROL APPARATUS

(71) Applicant: TOYOTA JIDOSHA KABUSHIKI KAISHA, Toyota-shi, Aichi-ken (JP)

(72) Inventor: Ryoji Sato, Toyohashi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/624,840

(22) Filed: Feb. 18, 2015

(65) Prior Publication Data
US 2015/0232095 A1    Aug. 20, 2015

(30) Foreign Application Priority Data

Feb. 20, 2014   (JP) ................................ 2014-030615
Feb. 4, 2015    (JP) ................................ 2015-020016

(51) Int. Cl.
*B60W 30/16*    (2012.01)
*B60W 10/26*    (2006.01)
*B60W 30/18*    (2012.01)
(Continued)

(52) U.S. Cl.
CPC ............. *B60W 30/16* (2013.01); *B60L 3/0046* (2013.01); *B60L 3/04* (2013.01); *B60L 7/14* (2013.01); *B60L 11/1803* (2013.01); *B60L 11/1861* (2013.01); *B60L 15/2009* (2013.01); *B60W 10/26* (2013.01); *B60W 30/18127* (2013.01); *B60L 2210/14* (2013.01); *B60L 2240/12* (2013.01); *B60L 2240/421* (2013.01); *B60L 2240/423* (2013.01); *B60L 2240/427* (2013.01); *B60L 2240/547* (2013.01); *B60L 2240/549* (2013.01); *B60L 2250/10* (2013.01); *B60L 2250/12* (2013.01); *B60L 2250/16* (2013.01); *B60W 10/08* (2013.01); *B60W 2510/081* (2013.01); *B60W 2520/10* (2013.01); *B60W 2550/302* (2013.01); *B60W 2550/308* (2013.01); *B60W 2710/083* (2013.01); *Y02T 10/7005* (2013.01)

(58) Field of Classification Search
CPC ..... B60W 30/16; B60W 10/08; B60W 10/26; H02J 7/00
USPC ........ 701/96, 93, 22, 301; 340/903, 435, 436; 320/109
See application file for complete search history.

(56) References Cited

U.S. PATENT DOCUMENTS

| 7,165,817 B2* | 1/2007 | Yokoyama | B60T 8/3255 303/122.04 |
| 2005/0200462 A1* | 9/2005 | Maekawa | B60Q 5/008 340/435 |

(Continued)

FOREIGN PATENT DOCUMENTS

| JP | 2005-348558 A | 12/2005 |
| JP | 2010-188858 A | 9/2010 |
| JP | 2012-249478 A | 12/2012 |

*Primary Examiner* — Tan Q Nguyen
(74) *Attorney, Agent, or Firm* — Kenyon & Kenyon LLP

(57) ABSTRACT

A vehicle control apparatus includes a battery, a boost converter connected to the battery for boosting battery voltage, an inverter connected to the boost converter for performing DC to AC conversion, and a motor-generator connected to the inverter for outputting drive power. Then, if an inter-vehicle distance is less than or equal to a predetermined distance or a relative speed in approaching direction is greater than or equal to a predetermined speed, the output voltage of the boost converter is lowered. This suppresses the output of the motor-generator and controls the inter-vehicle distance.

10 Claims, 4 Drawing Sheets

(51) Int. Cl.
*B60L 3/00* (2006.01)
*B60L 3/04* (2006.01)
*B60L 7/14* (2006.01)
*B60L 11/18* (2006.01)
*B60L 15/20* (2006.01)
*H02J 7/00* (2006.01)
*B60W 10/08* (2006.01)

(56) References Cited

U.S. PATENT DOCUMENTS

2012/0309588 A1 12/2012 Ashida et al.
2013/0127413 A1* 5/2013 Ohtomo ................ B60L 3/003
320/109

* cited by examiner

VEHICLE CONTROL APPARATUS

PRIORITY INFORMATION

This application claims priority to Japanese Patent Applications No. 2014-030615, filed on Feb. 20, 2014, and No. 2015-020016, filed on Feb. 4, 2015 which are incorporated herein by reference in their entirety.

TECHNICAL FIELD

The present invention relates to a vehicle control apparatus for controlling a vehicle in accordance with an inter-vehicle distance to a preceding vehicle traveling in front.

BACKGROUND ART

Heretofore, there are known apparatuses for detecting a vehicle traveling in front and automatically performing deceleration control when the inter-vehicle distance to the preceding vehicle shortens. In an electric vehicle (EV) or hybrid vehicle (HV) wherein a drive motor has been mounted, patent document 1 discloses generating a torque in a decelerating direction by a drive motor when the preceding vehicle or the like is approached.

PRIOR ART DOCUMENT

Patent Document

Patent Document 1: Japanese Patent Laid-Open Publication No. 2005-348558

SUMMARY OF THE INVENTION

In patent document 1 a deceleration torque is generated by inverter control. Here, in an EV or HV, DC power from a battery is often supplied to an inverter after battery voltage is boosted by a boost converter. If control of the boost converter can be utilized for inter-vehicle control, inter-vehicle control can conceivably be further improved.

The present invention is a vehicle control apparatus for controlling a vehicle in accordance with an inter-vehicle distance or a relative speed to a preceding vehicle traveling in front and includes a battery, a boost converter connected to the battery for boosting battery voltage, an inverter connected to the boost converter for performing DC to AC conversion, a motor-generator connected to the inverter for outputting drive power, and a controller for lowering output voltage of the boost converter when an inter-vehicle distance is less than or equal to the predetermined distance or the relative speed in approaching direction is greater than or equal to a predetermined speed.

Furthermore, in one embodiment, when said inter-vehicle distance is further reduced or said relative speed is further increased, the voltage boosted by the boost converter is set to a larger state than a counter electromotive force by the motor-generator and the inverter is shut down.

Furthermore, in one embodiment, during the voltage boosted by said boost converter is set to a larger state than counter electromotive force by said motor-generator, and said inverter is shut down, when said inter-vehicle distance is further reduced or said relative speed is further increased, the voltage boosted by the boost converter is set to a smaller state than the counter electromotive force by the motor-generator.

Furthermore, in one embodiment, during the voltage boosted by said boost converter is set to a larger state than counter electromotive force by said motor-generator, and said inverter is shut down, when said inter-vehicle distance is further reduced or said relative speed is further increased, if a state of charge of the battery is less than or equal to a predetermined value, the voltage boosted by the boost converter is set to a smaller state than the counter electromotive force by the motor-generator, and if the state of charge of the battery is greater than the predetermined value, the voltage boosted by the boost converter is set to a larger state than the counter electromotive force by the motor-generator.

Furthermore, in one embodiment, said controller calculate a collision risk based on said inter-vehicle distance and said relative speed, and determines that the inter-vehicle distance is less than or equal to the predetermined distance or the relative speed in approaching direction is greater than or equal to the predetermined speed when the calculated collision risk is greater than or equal to a predetermined value.

In the embodiment, when the preceding vehicle is approached and the inter-vehicle distance shortens, lowering the output voltage of the boost converter suppresses the output of the motor-generator and enables inter-vehicle control.

DETAILED DESCRIPTION OF THE EMBODIMENT

Embodiments of the present invention will be described hereinafter with reference to the attached drawings. It should be noted that the present invention is not intended to be limited to the embodiments described herein.

Overall Configuration

Figure 1:
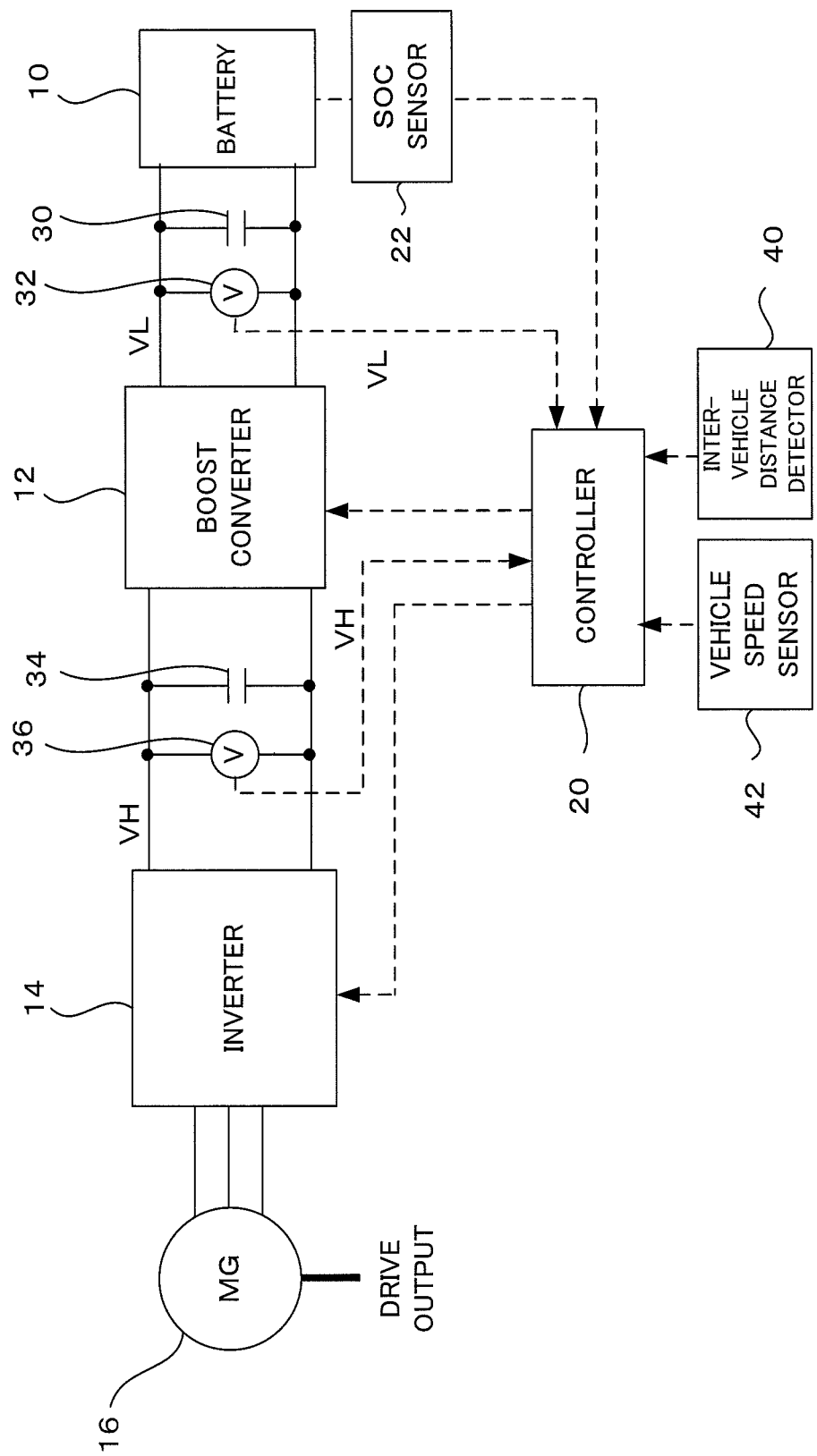
FIG. 1 is a block diagram of an electric vehicle (EV) employing a vehicle control apparatus.

FIG. 1 is a block diagram of an EV employing the vehicle control apparatus relating to the embodiment. The present invention can also be applied in a similar manner to an HV since the vehicle travels utilizing a motor-generator.

A DC output VL of a battery 10 is supplied to a boost converter 12. The boost converter 12 is a DC-DC converter for stepping up or stepping down a voltage and boosts the voltage VL, which is the output of the battery 10 before the boost operation, to a boosted voltage VH, which is the voltage after the boost operation, and supplies the boosted voltage VH to an inverter 14. To the inverter 14 is connected a drive MG (motor-generator) 16.

An output shaft of the MG 16 is mechanically connected to wheels and the vehicle travels due to a drive output of the MG 16. The vehicle may be a hybrid vehicle (HV) in which an engine is mounted and in this case the motor-generator for vehicular travel corresponds to the MG 16. In FIG. 1, the power transmission system is indicated by ordinary solid lines and the signal transmission system (control system) is indicated by dashed lines.

A controller 20 controls the inverter 14 in accordance with an accelerator pedal depression amount, a target torque determined from vehicle speed, and so forth, to control the drive output by the MG 16. Furthermore, during deceleration of the vehicle, the inverter 14 is controlled, regenerative braking by the MG 16 is performed, and the battery 10 is charged from the obtained regenerative electric power. Moreover, an SOC sensor 22 detects a state of charge (SOC) of the battery 10. Any sensor capable of detection based on cumulative battery current, battery open-circuit voltage, a combination of battery voltage and battery current, and so forth, can be employed for the SOC sensor 22 provided the SOC of the battery 10 can be detected.

Furthermore, between the positive and negative sides of VL, which is the output of the battery 10, a capacitor 30 is provided for smoothing the output voltage of the battery 10 and a pre-boost voltage sensor 32 is provided for measuring the pre-boost voltage VL of the capacitor 30. Moreover, at the output side of the boost converter 12 is provided a capacitor 34 for smoothing the boosted voltage VH and a boosted voltage sensor 36 is provided for measuring the boosted voltage VH, which is the voltage of the capacitor 34. The boosted voltage VH is the input voltage of the inverter 14.

The controller 20 controls the inverter 14 as described hereinabove and controls the drive of the MG 16. At this time, power supplied to the MG 16 is determined by detecting rotational phase and motor current of the MG 16 so that actual d and q axis currents obtained therefrom approach target d and q axis currents.

Furthermore, an inter-vehicle distance detector 40 is provided in the embodiment for detecting the inter-vehicle distance to the preceding vehicle and the detection value of the inter-vehicle distance detector 40 is supplied to the controller 20. Various types or forms of detector, such as a laser system for emitting a laser forward and detecting reflected light, an ultrasonic system for emitting ultrasonic waves, or a radio wave radar, can be employed for the inter-vehicle distance detector 40.

Furthermore, to the controller 20 is supplied a vehicle speed from a vehicle speed sensor 42. The vehicle speed sensor 42 may utilize a sensor normally mounted in the vehicle. The controller 20 detects relative speed from changes in the inter-vehicle distance to the preceding vehicle obtained from the inter-vehicle distance detector 40 and calculates risk from the inter-vehicle distance, relative speed, and vehicle speed. The relative speed may be detected from Doppler shift in the transmitted and received radio waves or light. First, a safe inter-vehicle distance can be determined beforehand in accordance with vehicle speed and a collision risk can be calculated by taking into consideration the relative speed at the time. The safe inter-vehicle distance is an inter-vehicle distance at which a collision can be sufficiently avoided by an ordinary driver when the preceding vehicle suddenly applies the brakes and can be determined, for example, by calculating an average time until the brakes are suddenly applied by an ordinary driver in response to sudden braking of the preceding vehicle and an inter-vehicle distance at which a collision can be avoided by deceleration from an average braking operation to which is provided a certain margin. Since the safe inter-vehicle distance at which a collision can be avoided changes according to relative speed, the safe inter-vehicle distance is changed in accordance with the relative speed. For example, if the safe inter-vehicle distance is determined in accordance with vehicle speed without taking into consideration the relative speed, the safe inter-vehicle distance is changed to be longer when the relative speed is in the direction approaching the preceding vehicle, and changed to be shorter when the relative speed is in the direction receding from the preceding vehicle. Then, the collision risk, which is the probability the inter-vehicle distance becomes 0, can be determined by comparing the safe inter-vehicle distance determined in accordance with vehicle speed and relative speed and the detected current inter-vehicle distance, and by increasing the current inter-vehicle distance when shorter compared to the safe inter-vehicle distance. Furthermore, a change in the collision risk corresponding to a difference between the current inter-vehicle distance and the safe inter-vehicle distance becomes large when the vehicle speed is high and the relative speed is in the approaching direction. In practice, it is preferable to determine the risk by having a map for outputting risk with inter-vehicle distance, vehicle speed, and relative speed as inputs. Furthermore, deceleration performance of the vehicle may also be taken into consideration in the calculation of risk. Moreover, the safe inter-vehicle distance or the collision risk may be detected by taking into consideration an image of the preceding vehicle. Still further, a stationary object instead of a preceding vehicle may be the collision object and the safe inter-vehicle distance or the collision risk may be calculated for this case. Various methods have been proposed for the calculation of collision risk and a known method can be appropriately employed. Furthermore, the inter-vehicle distance need not be detected in the vehicle and may be obtained through communication from an external monitoring system. The collision risk may be received through communication from an external monitoring system.

In the embodiment, the controller 20 evaluates the risk for the vehicle in three levels. Risk A has a small risk and risk C has the highest risk where risk A=slightly risky<risk B=risky<risk C=very risky. For example, the risk is set to risk A when the detected inter-vehicle distance is smaller than the aforementioned safe distance (predetermined inter-vehicle distance) and the calculated risk is, for example, 5% to 10%, risk B when the detected inter-vehicle distance is smaller than the inter-vehicle distance for risk A and the calculated risk is, for example, 10% to 15%, and risk C when the detected inter-vehicle distance is smaller than the inter-vehicle distance for risk B and the calculated risk is, for example, 15% to 20%, and a warning lamp is lit (acceleration is restricted) for risk A, a warning sound is emitted (acceleration is prohibited) for risk B, and a deceleration operation is performed for risk C.

Instead of the risk, only the inter-vehicle distance or the relative speed may be considered. For example, it is determined that the risk is risk A when an inter-vehicle distance is less than or equal to a predetermined distance or a relative speed in approaching direction is greater than or equal to a predetermined speed. Furthermore, it is determined that the risk is risk B when the inter-vehicle distance is further reduced or the relative speed in approaching direction is further increased and it is determined that the risk is risk C when the inter-vehicle distance is one more step reduced or the relative speed in approaching direction is one more step increased.

Processing According to Risk

Then, in the embodiment, the controller 20 controls the boost converter 12 in accordance with the collision risk. This control process is described with reference to FIG. 2.

First, a decision is made as to whether the vehicle is accelerating (S11). The process of the embodiment is basically a process during acceleration and a process during deceleration is handled by another process. Therefore, if the decision of S11 results in NO, the process terminates since control to suppress the output of the MG 16 is unnecessary. Next, a decision is made as to whether or not the collision risk (risk) is greater than or equal to "A" (S12). If this decision is NO, the risk is lower than "A" and the process is terminated since the process taking risk into consideration is unnecessary. On the other hand, if the decision is YES, a decision is made as to whether or not the risk is greater than or equal to "B" (S13).

If the decision is NO, the risk is "A" and in this case the boosted voltage VH is lowered (S14). Here, the boosted voltage VH is determined in accordance with a target output torque. Issuing a command to lower the boosted voltage VH lowers the maximum output of the MG 16. This restricts the maximum output torque of the MG 16 and the acceleration of the vehicle is restricted. Here, the output torque of the MG 16 can also be restricted. However, restriction of the output torque of the MG 16 is normally performed in a control loop based on target output torque and it may take time until sufficient output restriction is performed. Furthermore, in the restriction of the output torque, it is also possible the output torque will not decrease due to the influence of another command relating to output torque. Lowering the boosted voltage VH as in S14 enables the maximum output of the MG 16 to be reliably restricted.

In the case of YES in S13, a decision is made as to whether the risk is "C" (S15). If this decision results in NO, the risk is "B" and in this case the MG 16 is shut down (S16) with the boosted voltage VH greater than or equal to the counter electromotive force ωφ of the MG 16. Namely, all switching elements in the inverter 14 are turned off. Thus, the power supply from the inverter to the MG 16 shuts down and the MG 16 shuts down.

As a result, the output of the MG 16 reliably becomes 0 and acceleration due to output from the MG 16 is reliably prevented. Setting the boosted voltage VH to a value larger than the counter electromotive force ωφ causes the MG 16 to become a load and regenerative braking not to be performed. Namely, electric power generation due to drag of the MG 16 and deceleration of the vehicle do not occur.

In normal situations, the risk rises in A→B→C sequence. Therefore, even if the process for S14 is performed, the process for S16 is performed when the risk rises further. In S16, the boosted voltage VH is lowered by using the boost converter 12 when the risk is increased from risk B to risk C during performing the process of S14. However, if another vehicle cuts in front of the vehicle, in some cases the process for S14 is not performed and the process for S16 may be performed.

If the result in S15 is YES, the risk is "C". In this case, a decision is made as to whether the SOC is at a predetermined level or lower (S17). Then, if the decision of S17 is YES, the boosted voltage VH is set smaller than the counter electromotive force ωφ of the MG 16 and the MG 16 is shut down (S18). In this manner, setting the boosted voltage VH smaller than the counter electromotive force ωφ causes the MG 16 to become a load and electric power to be generated. Namely, the deceleration due to the drag of the MG 16 occurs and as a result the vehicle decelerates. The electric power obtained by power generation of the MG 16 charges the battery 10.

Figure 3:
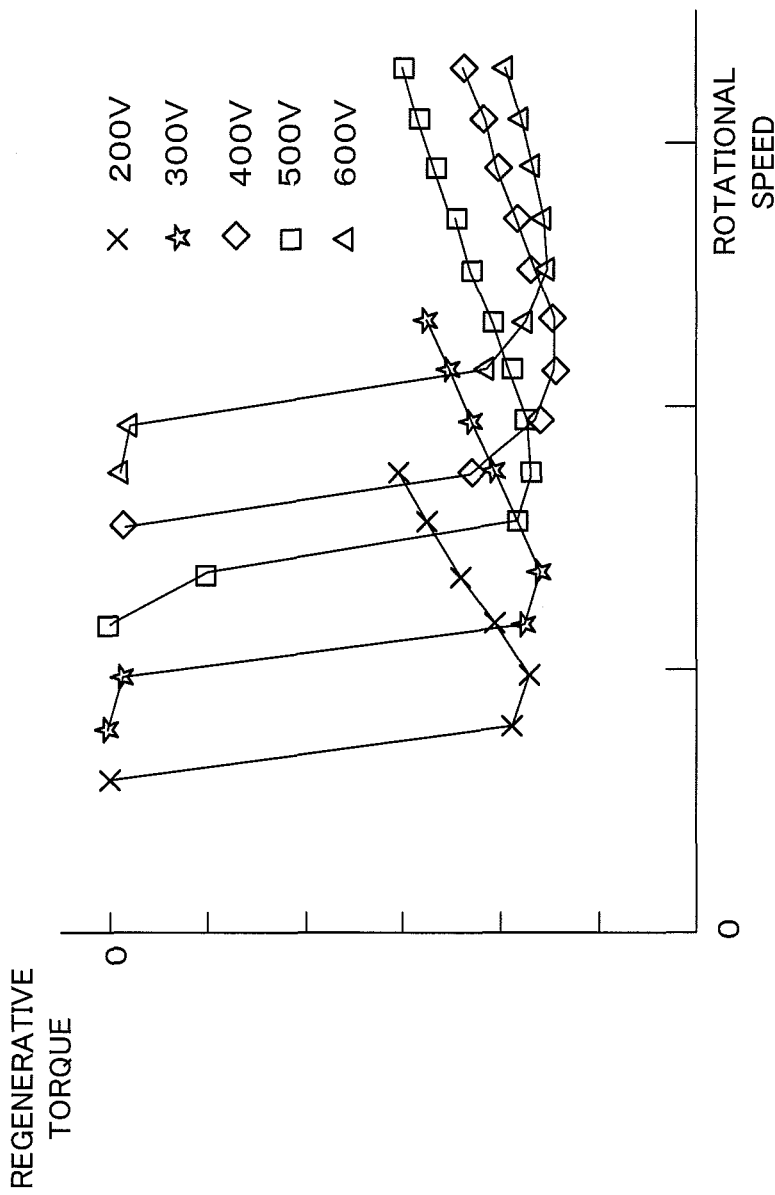
FIG. 3 shows a relationship of regenerative torque and VH at shutdown.

FIG. 3 shows a relationship between rotational speed of the MG 16 and drag torque at different values of boosted voltage VH. In FIG. 3, the vertical axis represents the drag torque generated by the MG 16 and the drag torque increases downward. Furthermore, the horizontal axis represents the rotational speed and the drag torque increases with rotational speed. The relationship between rotational speed and drag torque is shown with the boosted voltage varied from 200 V to 600 V in 100 V increments. In the case of S18, the boosted voltage VH is controlled so that the drag torque increases (for example, to maximum) with rotational speed. For example, it is preferable to have the controller 20 hold this sort of map and set the boosted voltage VH in S18. In S16, it is preferable to set the boosted voltage VH to a value at which drag torque is not generated on the basis of the relationship in FIG. 3.

Furthermore, as described hereinabove, in normal situations, the risk rises in A→B→C sequence. Therefore, even if the process for S16 is performed, the process for S18 is performed when the risk further rises. In this case, the MG 16 has already shut down, the boosted voltage VH is reduced, and only deceleration due to drag by the MG 16 is performed. If another vehicle cuts in front of the vehicle, the process for S16 is not performed and the process for S18 is performed, and in this case the MG 16 shuts down in S18.

If the decision of S17 results in NO, the operation proceeds to S16 and the MG 16 is shut down by shutting down the inverter 14 without causing drag from being generated by the MG 16. Therefore, charging of the battery 10 is not performed.

The predetermined SOC of S17 has been set to a high value, for example, to the order of 95%. As a result, the battery 10 is prevented from overcharging from electric power generation by the drag of the MG 16. Accordingly, this prevents degradation by overcharging of the battery 10. It should be noted deceleration is not possible by the MG 16 at this time. Accordingly, it is preferable to automatically apply hydraulic brakes to compensate for an equivalent deceleration by the drag of the MG 16.

Figure 2:
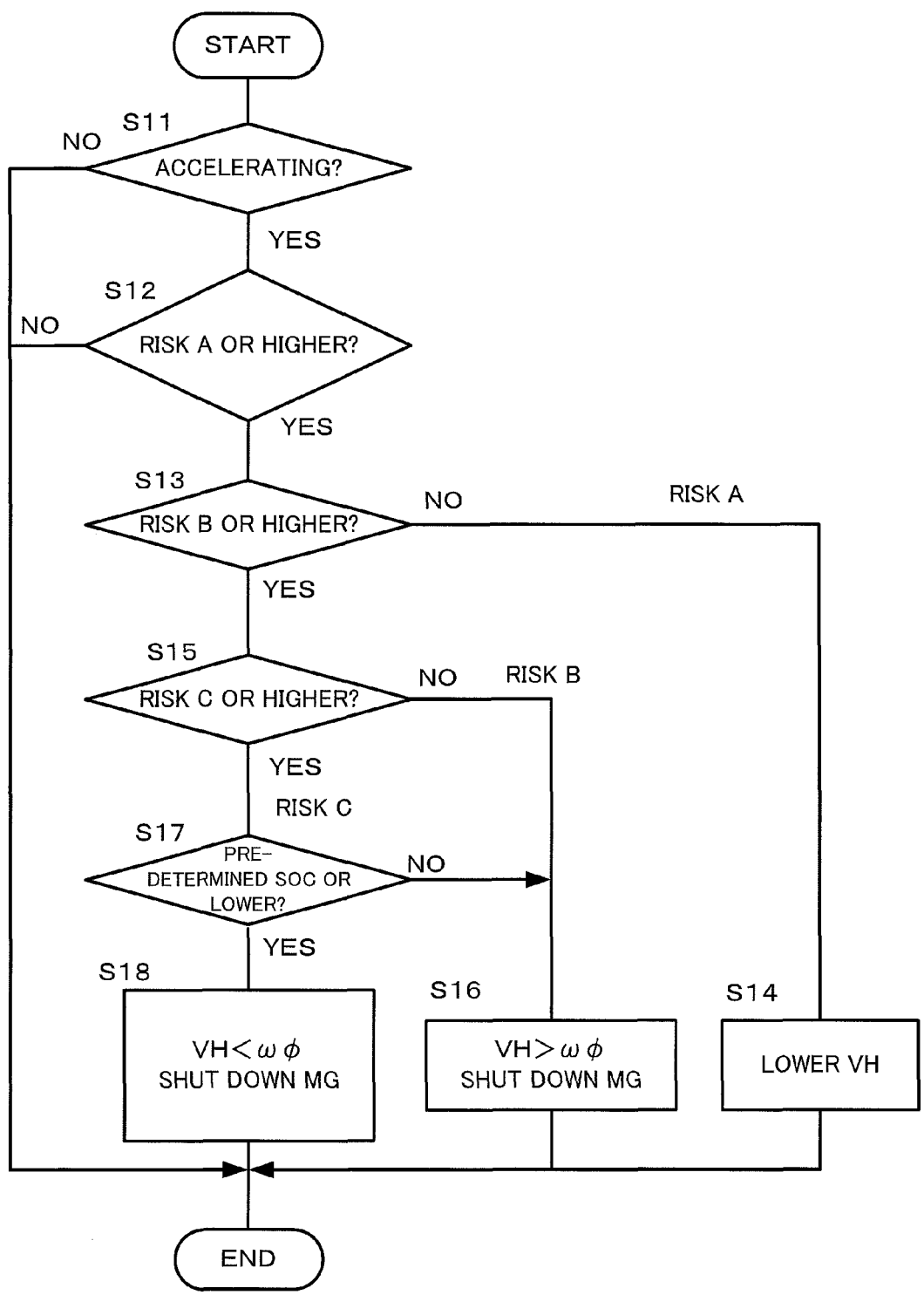
FIG. 2 is a flowchart of vehicle control in accordance with inter-vehicle distance.

Furthermore, if S15 is deleted and the risk is greater than or equal to "B" in FIG. 2, the decision of S17 is performed and S16 or S18 may be performed according to the SOC. In this case, it is also preferable to change the drag torque generated in S18 according to risk. Namely, it is preferable to set the boosted voltage VH so that the drag torque becomes large when the risk is high and the drag torque becomes small when the risk is low.

Furthermore, if the risk further increases, a collision avoidance process may be performed, such as for stopping the vehicle by hydraulic brakes.

In this manner, according to the embodiment, controlling the boost by the boost converter 12 in accordance with risk changes the boosted voltage VH, thereby controlling the operation of the MG 16. Therefore, effective risk avoidance can be performed. Various processes have been proposed for risk avoidance and it is preferable to perform them together with the process of this embodiment.

Boost Converter Configuration

Figure 4:
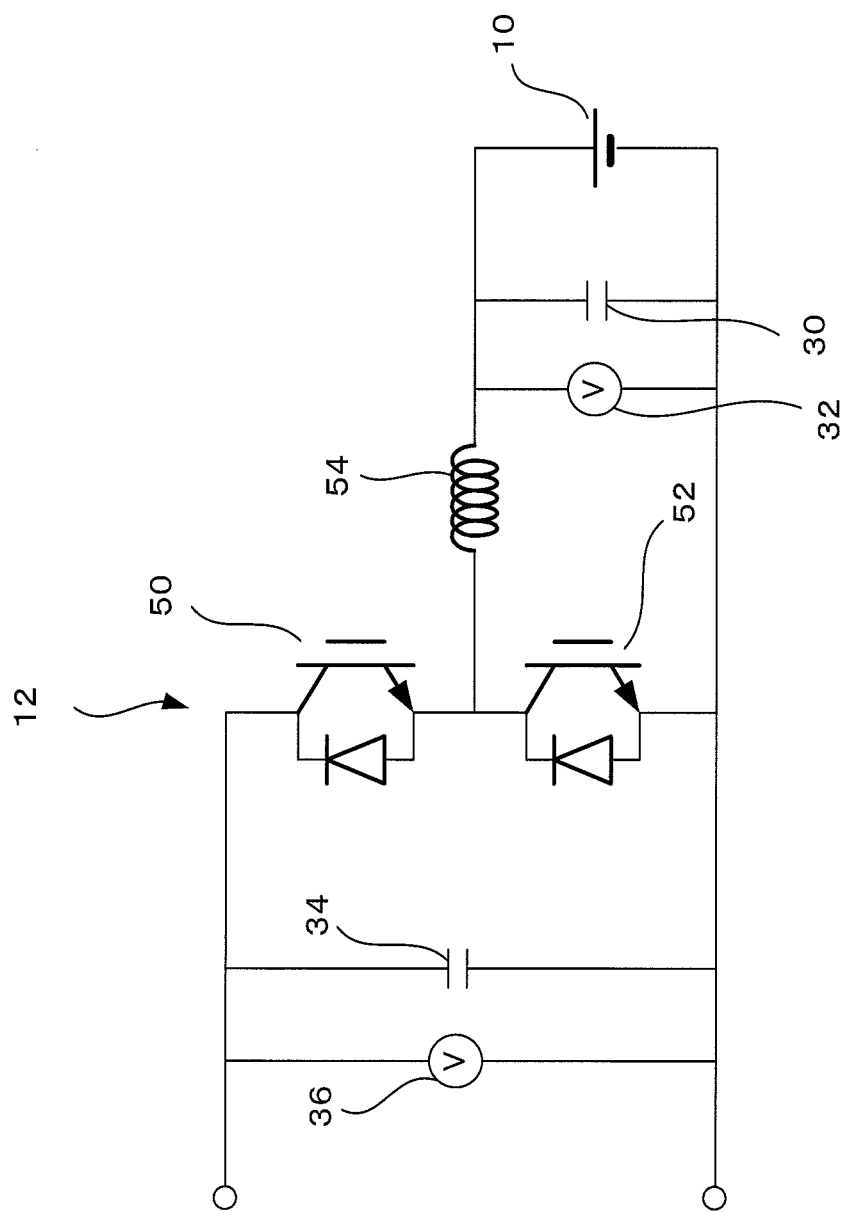
FIG. 4 is a circuit diagram of the boost converter.

FIG. 4 shows the internal configuration of the boost converter 12. The boost converter 12 is configured from two switching elements 50, 52 connected in series and one reactor 54 connected to an intermediate point between the switching elements 50, 52. Each switching element 50, 52 comprises a transistor, such as an IGBT, and a diode for allowing reverse current of the transistor to flow.

One terminal of the reactor 54 is connected to the positive electrode (positive side of VL) of the battery 10 and the other terminal of the reactor 54 is connected to the intermediate point between the switching elements 50, 52. The switching element 50 has the transistor collector connected to the positive bus (positive side of VH) of the inverter 14 and the emitter to the transistor collector of the switching element 52. The transistor emitter of the switching element 52 is connected to the negative electrode of the battery 10 and the negative bus (negative side of VH and VL) of the inverter 14.

The pre-boosted voltage VL and the boosted voltage VH detected by the pre-boost voltage sensor 32 and the boosted voltage sensor 36 are supplied to the controller 20. The controller 20 determines a target boosted voltage VH on the basis of a target output torque and controls the boost converter 12 so that the boosted voltage VH matches the target value.

While there has been described what are at present considered to be preferred embodiments of the invention, it will be understood that various modifications may be made thereto, and it is intended that the appended claims cover all such modifications as fall within the true spirit and scope of the invention.

LIST OF REFERENCE NUMERALS

10 BATTERY
12 BOOST CONVERTER
14 INVERTER
16 MG (MOTOR-GENERATOR)
20 CONTROLLER
22 SOC SENSOR
30, 34 CAPACITOR
32 PRE-BOOST VOLTAGE SENSOR
36 BOOSTED VOLTAGE SENSOR
40 INTER-VEHICLE DISTANCE DETECTOR
42 VEHICLE SPEED SENSOR
50, 52 SWITCHING ELEMENT
54 REACTOR

What is claimed is:

1. A vehicle control apparatus for controlling a vehicle in accordance with an inter-vehicle distance to a preceding vehicle traveling in front, comprising:
a battery;
a boost converter connected to the battery for boosting battery voltage;
an inverter connected to the boost converter for performing DC to AC conversion;
a motor-generator connected to the inverter for outputting drive power; and
a controller programmed to lower output voltage of said boost converter when the inter-vehicle distance is less than or equal to a predetermined distance.

2. A vehicle control apparatus according to claim 1, wherein:
when said inter-vehicle distance is further reduced, the voltage boosted by said boost converter is set to a larger state than counter electromotive force by said motor-generator, and said inverter is shut down.

3. A vehicle control apparatus according to claim 2, wherein:
during the voltage boosted by said boost converter is set to a larger state than counter electromotive force by said motor-generator, and said inverter is shut down, when said inter-vehicle distance is further reduced, the voltage boosted by said boost converter is set to smaller state than counter electromotive force by said motor-generator.

4. A vehicle control apparatus according to claim 2, wherein:
during the voltage boosted by said boost converter is set to a larger state than counter electromotive force by said motor-generator, and said inverter is shut down when said inter-vehicle distance is further reduced,
if a state of charge of said battery is less than or equal to a predetermined value, the voltage boosted by said boost converter is set to a smaller state than counter electromotive force by said motor-generator; and
if the state of charge of said battery is greater than the predetermined value, the voltage boosted by said boost converter is set to a larger state than counter electromotive force by said motor-generator.

5. A vehicle control apparatus for controlling a vehicle in accordance with an inter-vehicle distance to a preceding vehicle traveling in front, comprising:
a battery;
a boost converter connected to the battery for boosting battery voltage;
an inverter connected to the boost converter for performing DC to AC conversion;
a motor-generator connected to the inverter for outputting drive power; and
a controller programmed to lower output voltage of said boost converter when the inter-vehicle distance is less than or equal to a predetermined distance, wherein:
said controller calculate a collision risk based on said inter-vehicle distance, and determines that the inter-vehicle distance is less than or equal to the predetermined distance when the calculated collision risk is greater than or equal to a predetermined value.

6. A vehicle control apparatus for controlling a vehicle in accordance with a relative speed to a preceding vehicle traveling in front, comprising:
a battery;
a boost converter connected to the battery for boosting battery voltage;
an inverter connected to the boost converter for performing DC to AC conversion;
a motor-generator connected to the inverter for outputting drive power; and
a controller programmed to lower output voltage of said boost converter when the relative speed in approaching direction is greater than or equal to a predetermined speed.

7. A vehicle control apparatus according to claim 6, wherein:
when said relative speed is further increased, the voltage boosted by said boost converter is set to a larger state than counter electromotive force by said motor-generator, and said inverter is shut down.

8. A vehicle control apparatus according to claim 7, wherein:
during the voltage boosted by said boost converter is set to a larger state than counter electromotive force by said motor-generator, and said inverter is shut down, when said relative speed is further increased, the voltage boosted by said boost converter is set to smaller state than counter electromotive force by said motor-generator.

9. A vehicle control apparatus according to claim 7, wherein:
during the voltage boosted by said boost converter is set to a larger state than counter electromotive force by said motor-generator, and said inverter is shut down when said relative speed is further increased,
if a state of charge of said battery is less than or equal to a predetermined value, the voltage boosted by said boost converter is set to a smaller state than counter electromotive force by said motor-generator; and
if the state of charge of said battery is greater than the predetermined value, the voltage boosted by said boost converter is set to a larger state than counter electromotive force by said motor-generator.

10. A vehicle control apparatus according to claim 6, wherein:
said controller calculate a collision risk based on said relative speed, and determines that the relative speed in approaching direction is greater than or equal to the predetermined speed when the calculated collision risk is greater than or equal to a predetermined value.

* * * * *